(12) United States Patent
Fujikura et al.

(10) Patent No.: US 11,071,891 B2
(45) Date of Patent: Jul. 27, 2021

(54) EXERCISE BALL MANUFACTURING METHOD

(71) Applicant: MIKASA CORPORATION, Hiroshima (JP)

(72) Inventors: Takashi Fujikura, Hiroshima (JP); Yukio Sunamori, Hiroshima (JP); Akinori Hamamoto, Hiroshima (JP)

(73) Assignee: MIKASA CORPORATION, Hiroshima (JP)

( * ) Notice: Subject to any disclaimer, the term of this patent is extended or adjusted under 35 U.S.C. 154(b) by 0 days.

(21) Appl. No.: 16/755,013

(22) PCT Filed: Oct. 12, 2018

(86) PCT No.: PCT/JP2018/038039
§ 371 (c)(1),
(2) Date: Apr. 9, 2020

(87) PCT Pub. No.: WO2019/082685
PCT Pub. Date: May 2, 2019

(65) Prior Publication Data
US 2020/0330831 A1  Oct. 22, 2020

(30) Foreign Application Priority Data
Oct. 26, 2017  (JP) .............................. JP2017-207317

(51) Int. Cl.
*A63B 41/08*   (2006.01)
*A63B 45/00*   (2006.01)
(Continued)

(52) U.S. Cl.
CPC .............. *A63B 45/00* (2013.01); *A63B 41/08* (2013.01); *A63B 41/10* (2013.01);
(Continued)

(58) Field of Classification Search
CPC ......... A63B 45/00; A63B 41/08; A63B 41/10; A63B 2243/0037; A63B 2243/0095; B29D 22/04
See application file for complete search history.

(56) References Cited

U.S. PATENT DOCUMENTS 2,352,872 A * 7/1944 Voit ....................... A63B 41/08
  473/605
4,333,648 A * 6/1982 Aoyama ................ A63B 41/10
  473/604
(Continued)

FOREIGN PATENT DOCUMENTS

CN   202227022 U   5/2012
CN   103492622 A   1/2014
(Continued)

OTHER PUBLICATIONS

Japanese Patent Office, International Search Report, PCT/JP2018/038039, dated Dec. 18, 2018.
(Continued)

*Primary Examiner* — Jeffry H Aftergut
(74) *Attorney, Agent, or Firm* — IpHorgan Ltd.

(57) ABSTRACT

Provided is a method for manufacturing an exercise ball which is made by using a pasted ball such as a soft leather ball and which has a lower impact value compared to a conventional yarn-wound ball. The exercise ball comprises a spherical hollow rubber bladder (2) in which compressed air is sealed, and a yarn-wound reinforcement layer (3) formed by evenly winding a filament yarn around the surface of the rubber bladder, wherein the exercise ball is characterized in that nylon filament yarn, obtained by hard twisting two 30-50 denier nylon filaments 1-*a*, 1-*b* in a single-direction twist is used as a winding yarn (1).

2 Claims, 3 Drawing Sheets

(51) Int. Cl.
　　　*A63B 41/10*　　(2006.01)
　　　*B29D 22/04*　　(2006.01)

(52) U.S. Cl.
　　　CPC ............... *A63B 2243/0037* (2013.01); *A63B 2243/0095* (2013.01); *B29D 22/04* (2013.01)

(56) References Cited

U.S. PATENT DOCUMENTS

| | | |
|---|---|---|
| 5,597,432 A | 1/1997 | Shishido et al. |
| 2013/0287990 A1 | 10/2013 | Katagi |

FOREIGN PATENT DOCUMENTS

| | | |
|---|---|---|
| CN | 204910658 U | 12/2015 |
| JP | 20060047109 A | 2/1994 |
| JP | H06-047109 A | 2/1994 |
| JP | 2000-005345 A | 1/2000 |
| JP | 20000005345 A | 1/2000 |

OTHER PUBLICATIONS

Japanese Patent Office, Written Opinion, PCT/JP2018/038039, dated Dec. 18, 2018.
Japanese Patent Office, International Preliminary Report on Patentability, PCT/JP2018/038039, dated Apr. 28, 2020.
The State Intellectual Property Office of People's Republic of China, the First Office Action, dated Nov. 3, 2020, Chinese Patent Application No. 201880069302.0, Applicant Micasa Co., Ltd.
The State Intellectual Property Office of People'S Republic of China, The Second Office Action, Chinese Patent Application 201880069302.0, Apr. 13, 2021, China.

\* cited by examiner

EXERCISE BALL MANUFACTURING METHOD

CROSS REFERENCE TO RELATED APPLICATIONS

This application is a national stage completion application of PCT Application No. PCT/JP2018/038039, filed Oct. 12, 2018, and claims priority from Japanese Application No. 2017-207317, filed Oct. 26, 2017. Each of these applications is incorporated by reference herein in its entirety.

TECHNICAL FIELD

The present invention relates to a method for manufacturing a sportsball having low impact force as compared with conventional sportsballs.

BACKGROUND ART

Conventionally, there are two kinds of sportsballs, one of which is called "a stick ball" including a hollow spherical rubber bladder filled with a compressed air, a thread wound reinforced layer provided on the surface of the bladder, and cover rubber sheet provided on the reinforced layer and vulcanized and molded, and skin materials bonded onto the surface of the cover rubber sheet, and the other of which is called "a stitched ball" including a rubber bladder covered with a plurality of panels stitched to one another. However, a ball to be used for games is the tick ball having the thread wound reinforcement which has superior durability.

In a typical structure of the stick ball, it comprises a rubber bladder filled with compressed air, a thread wound reinforced layer formed by evenly winding nylon or polyester filament threads each consisting of nylon filament yarns each of 50~100 deniers, around the surface of the bladder, an unvulcanized rubber sheet of natural rubber or chloroprene rubber or the like bonded onto the surface of the reinforced layer, a carcass obtained by vulcanizing and molding the unvulcanized rubber sheet on the bladder in a mold, and natural leather or synthetic leather panels bonded onto the surface of the carcass as skin materials. If the unvulcanized rubber sheet bonded onto the surface of the bladder is vulcanized, it becomes so called rubber ball.

PRIOR ART DOCUMENT

Japanese Patent Publication Heisei 6-47109, and
Japanese Patent Publication 2000-5345

SUMMARY OF THE PRESENT INVENTION

Problems to be Solved by the Invention

The "stick ball" as described above is superior in spherical stability and durability. However, at the time when the unvulcanized rubber sheet is vulcanized and molded in the mold, the thread wound reinforced layer is subject to cure under pressure, thereby forming a hard structure laminated with the rubber sheet. For this reason, the ball has hard touch feeling, a player feels pain on contact, and the ball gives great impact against the hands and foot of a player.

The rubber sheet provides elasticity and flexibility, and also serves as an element minimizing roughs of the surface of the thread wound reinforced layer, appeared from the thickness of the twisted thread, but it is impossible to thicken the rubber sheet under the provisions of weight in the game rule so that the rubber sheet imposes restrictions on selection of the winding thread to be used. For that reason, a soft-twisted thread is used as the winding thread for measures of mirror-through, but elongation of the rubber sheet shows properties close to the filament and this has become one of causes for hardness and pain. It has been desired to develop a ball of soft touch feeling and being not painful on contact while retaining the advantages of the thread wound reinforcement.

An object of the present invention is to provide a method for manufacturing a sportsball which is a stick ball such as soft leather ball having lower impact as compared with conventional thread wound balls.

MEANS FOR SOLVING THE PROBLEMS

The present invention provides a method for manufacturing a sportsball comprising a spherical hollow rubber bladder filled with compressed air and a thread wound reinforced layer formed by evenly winding nylon filament threads around the surface of the rubber bladder, wherein the nylon filament threads each formed by highly twisting two nylon filament yarns each of 30~50 deniers with a single twist, are used as winding threads.

According to the present invention, there is provided a method for manufacturing a sportsball, wherein each of the highly twisted nylon filament winding threads has 1800-2000 T/m twist.

According to the invention, there is further provided a method for manufacturing a sportsball, wherein in forming the thread wound reinforced layer, rubber cement is applied as binder to the winding threads simultaneously with winding the threads around the rubber bladder, in addition, the rubber-cement is sprayed onto the winding threads a little after beginning winding the threads around the bladder, and after finishing of winding the threads and then the threads are cut, the spraying of the rubber cement is further effected to cover the wound threads with the rubber cement, after drying, the thread wound bladder is then vulcanized and molded under heat to form a carcass, and natural or synthetic leather panels or expanded sheet panels are bonded onto the surface of the carcass with rubber-based bonding adhesive applied onto the surface of the carcass.

In case of only applying the rubber cement to the winding threads, the amount of the rubber cement is insufficient to disappear the thread lines appearing on the surface of a product and causing the phenomenon called a mirror-through, and according to the invention, this phenomenon can be restricted by spraying the rubber cement onto the winding threads and by further effecting the spraying of the rubber cement onto the wound threads after finishing winding the threads and then cutting of the threads, According to the present invention, the highly twisted nylon filament winding threads are interlaced with one another on the surface of the bladder and after the vulcanization, are set by rubber in interlocked state without causing lateral sliding.

A nylon filament winding thread which has been conventionally used, is a soft-twisted thread of less than 500 T/m twist, and in the present invention, so-called highly twisted nylon filament winding thread of 1800-2000 T/m twist is used. It has been found that the twist of the soft-twisted nylon filament winding thread is elongated by the action of compressed air filled in the bladder, so that the soft-twisted nylon filament thread shows the properties close to the filament yarn, and in the highly twisted nylon filament winding thread, it shows higher stretch properties as compared with the soft-twisted nylon filament thread (FIG. 1), and simultaneously with retaining performance of impact absorption, exhibits flexibility against force toward the center of the ball.

PREFERRED EMBODIMENT OF THE INVENTION

Figure 1:
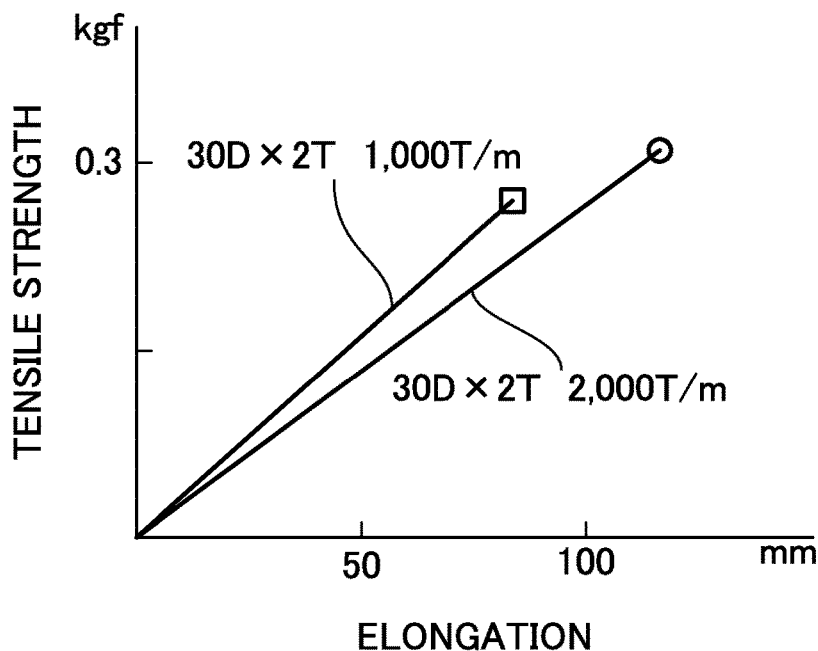
FIG. 1 shows a graph of twist vs elongation.
Figure 2:
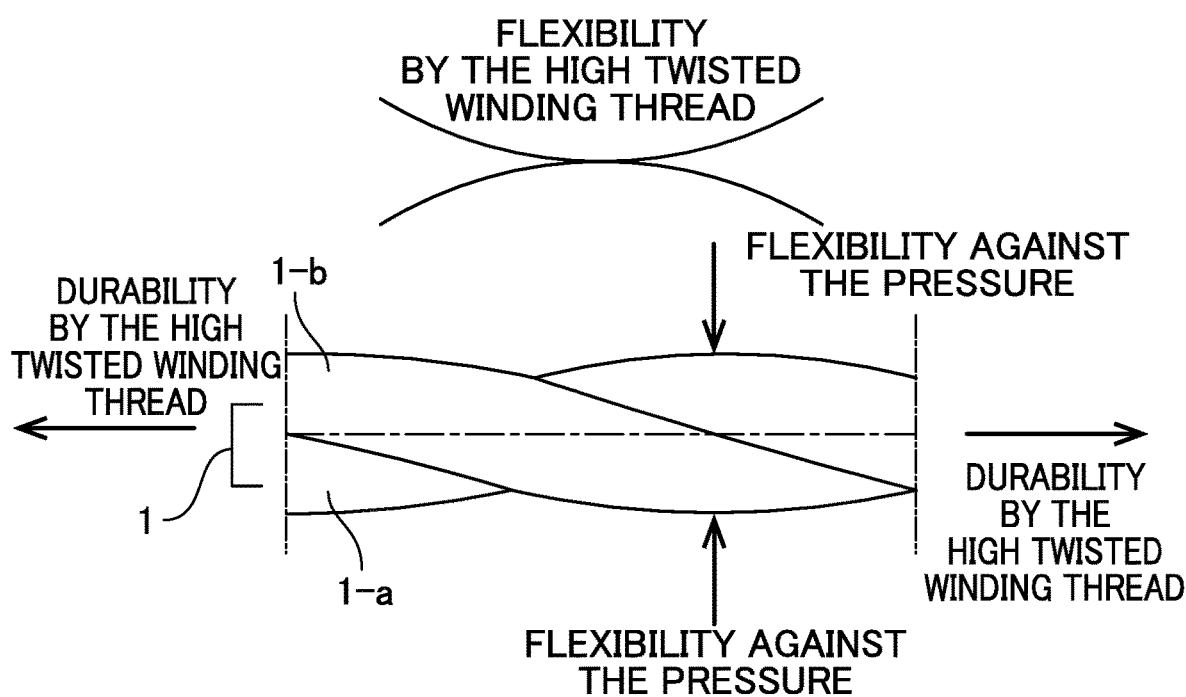
FIG. 2 is a explanatory view of an action of impact absorption.
Figure 5:
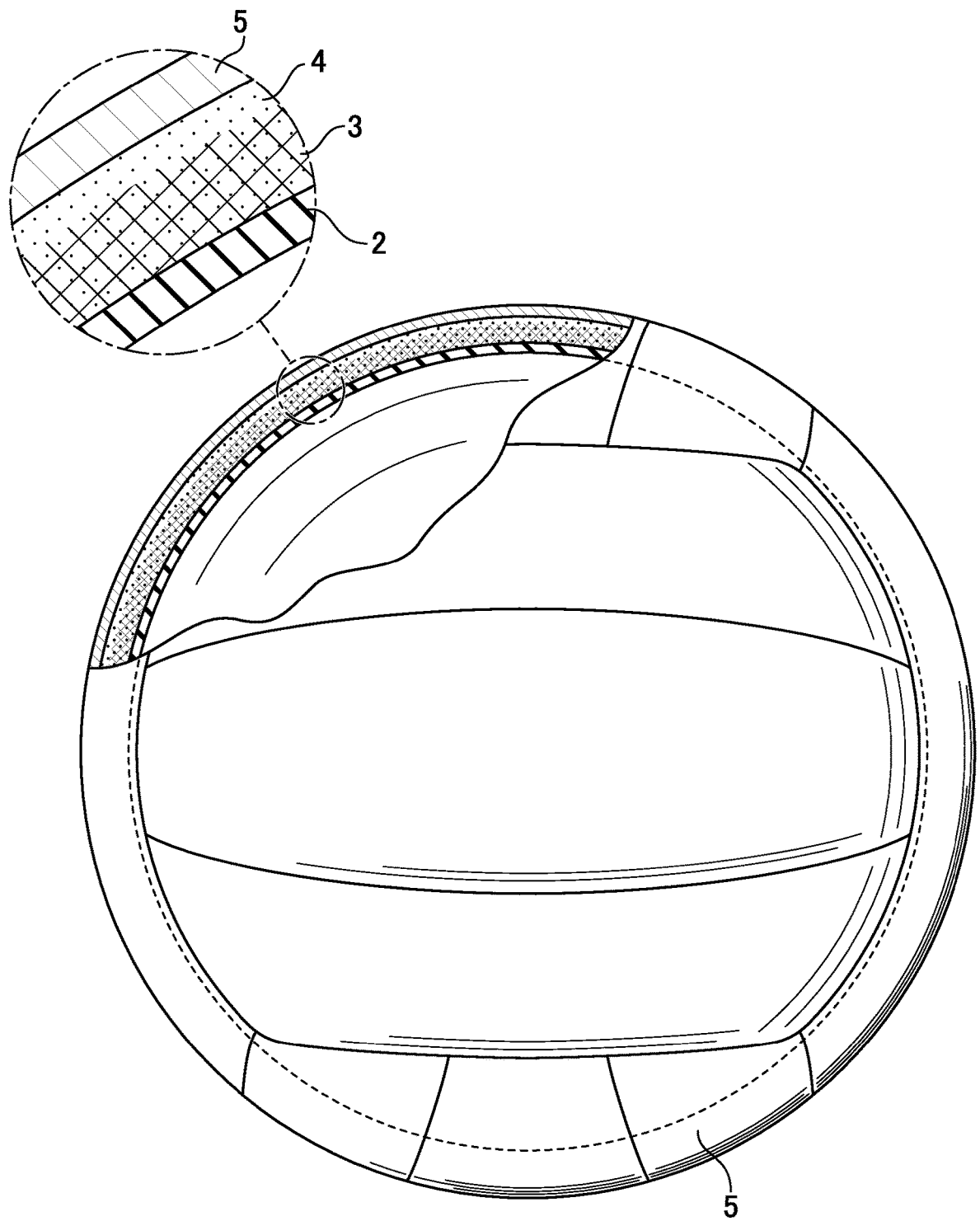
FIG. 5 is a cross-sectional view of a sportsball embodied in accordance with the invention.

FIG. 5 shows a structure of a sportsball according to the invention. In manufacturing the sportsball, a spherical hollow bladder 2 is formed from rubber of air-impermeability, such as butyl rubber and inflated with compressed air. Somewhat finer nylon filament threads as compared with a conventional thread, are evenly wound around the surface of the bladder to form a thread wound reinforced layer 3. Each of the nylon filament threads is formed by highly twisting two nylon filament yarns 1-a and 1-b each of 30~50 deniers with a single twist and used as a winding thread (see FIG. 2).

Rubber cement is applied as binder to the winding threads simultaneously with winding the threads around the rubber bladder, preferably, the rubber-cement is sprayed onto the winding threads a little after from the beginning of winding the threads around the bladder, and after finished winding the threads and then the threads are cut, the spraying of rubber cement onto the wound threads is further effected. In case of only applying the rubber cement to the winding threads, the amount of the rubber cement is insufficient to disappear the thread lines appearing on the surface of the product and causing the phenomenon called a mirror-through, and therefore, the spraying of the rubber cement onto the wound threads is effective in restricting this phenomenon. Thus, after the thread wound reinforced layer 3 with the winding threads coated with the rubber cement 4, has been obtained and then dried, they is vulcanized under heat in a mold to form a carcass, and natural or synthetic leather panels or an expanded sheet panels are bonded as a skin material 5 onto the surface of the carcass with rubber-based adhesive to obtain a sportsball.

EXAMPLE

The method for manufacturing the sportsball can be applied to various balls, but detailed description will be made below with respect to a typical volleyball.

A rubber bladder is formed from butyl rubber so as to form a spherical hollow body and compressed air is injected into the rubber bladder to inflate it. Nylon filament winding threads having higher stretching properties than them of conventional nylon filament threads are evenly wound around the surface of the bladder to form a thread wound reinforced layer. Each of the winding threads is so-called nylon filament high twisted threads each formed by highly twisting two nylon filament yarns each of 30 deniers, 1800-2500 T/m with a single twist, and a weight of the winding threads wound around the bladder is about 15 grams.

Rubber cement is applied as binder to the winding threads simultaneously with winding the threads around the rubber bladder, and sprayed in the form of particles onto the winding threads a little after beginning winding the threads around the bladder such that spaces between the wound threads are filled with the rubber cement. After finishing of winding the threads and then the threads are cut, the spraying of rubber cement onto the wound threads is further effected. After the wound threads has been prevented from slipping by cold dry, vulcanization and molding are effected. A mold for effecting the vulcanization and molding is provided on its inner surface with shallow grooves corresponding to the contours of leather panels to be boned onto the surface of the volleyball. The bladder with the dried thread wound reinforced layer coated with the rubber cement, is put in the mold, and compressed air of 8~9 $kg/cm^2$ is then injected into the bladder to inflate it. The dried thread wound reinforced layer coated with the rubber cement, is then vulcanized and molded at a temperature of 120~135° C. for 4~6 minutes. to form a carcass.

The winding thread formed by fine nylon filament yarns each of 30 deniers are used for formation of the thread wound reinforced layer, but the weight of the thread is insured due to the use of the high twisted thread and the durability of the thread can be maintained.

Due to effecting the vulcanization and molding with the mold, the winding threads in the thread wound reinforced layer are fixed by rubber without losing the high stretch properties which are the feature of the high twisted thread and the reinforced layer having flexibility is formed.

After the vulcanization and molding, the carcass is taken out of the mold and contours corresponding to leather panels appear on the surface of the carcass. Synthetic leather panels are bonded onto the surface of the carcass with natural rubber based adhesive or chloroprene rubber-based adhesive, in conformity with the contours so that a volleyball is formed as a product.

In the case of a soccer ball and a basketball, each of the winding threads used for formation of the thread wound reinforced layer is a nylon filament thread formed by highly twisting two nylon filament yarns each of 50 deniers with a single twist. In the case of the soccer ball, a weight of the wound threads is about 25 grams, and in the case of the basketball, a weight of the wound thread is about 30 grams.

Figure 3:
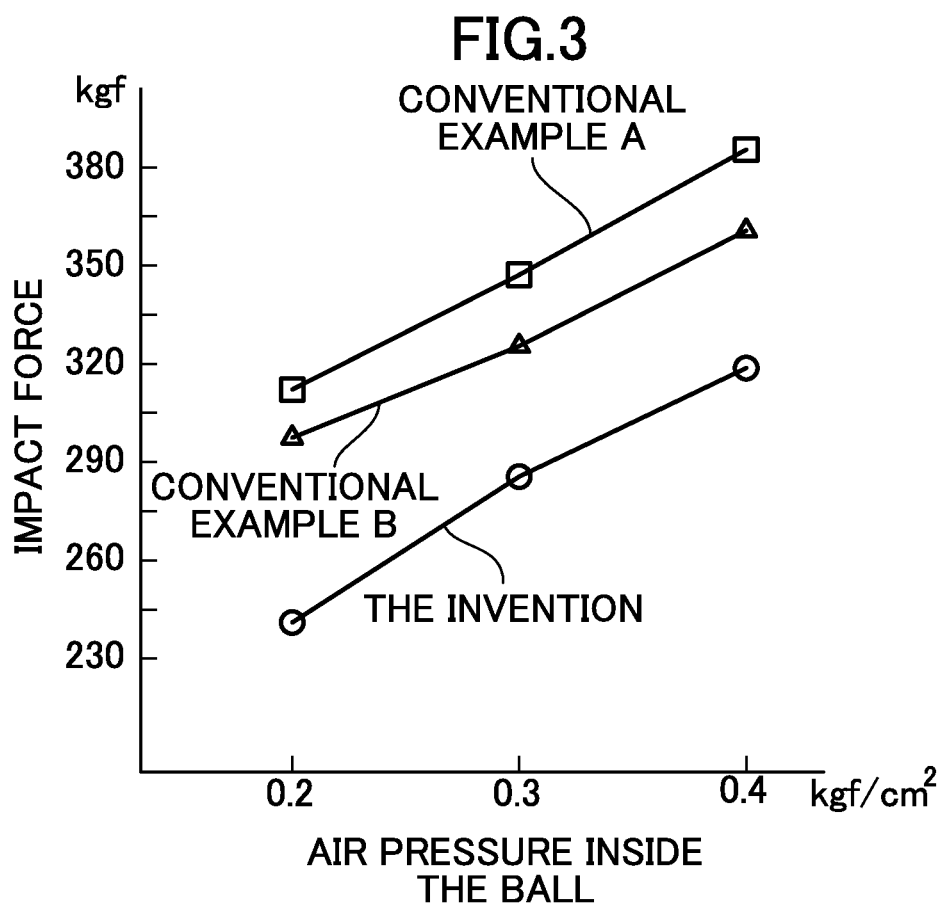
FIG. 3 is a graph showing measurements of impact forces.

In the volleyball according to the invention, there can be provided the thread wound reinforced layer having a high spring effect by heat setting the threads having high stretch properties, together with rubber cement latex due to effecting the volcanizing and molding with the mold. The ball has a spherical stability and durability which are an advantage of the thread wound reinforced layer and in addition, impact can be more decreased as compared with a conventional ball. An example of the advantages is indicated in a graph of measurements of impact forces of FIG. 3. The graph shows changes of the impact forces exerted at the time that at the air pressures of 0.2 $kg/cm^2$, 0.3 $kg/cm^2$ and 0.4 $kg/cm^2$ inside the ball, it was naturally dropped from one meter high onto a force plate. It can be seen in the graph that in the ball according to the invention, the decrease of the impact was 14%~17% as compared with the conventional balls.

Figure 4:
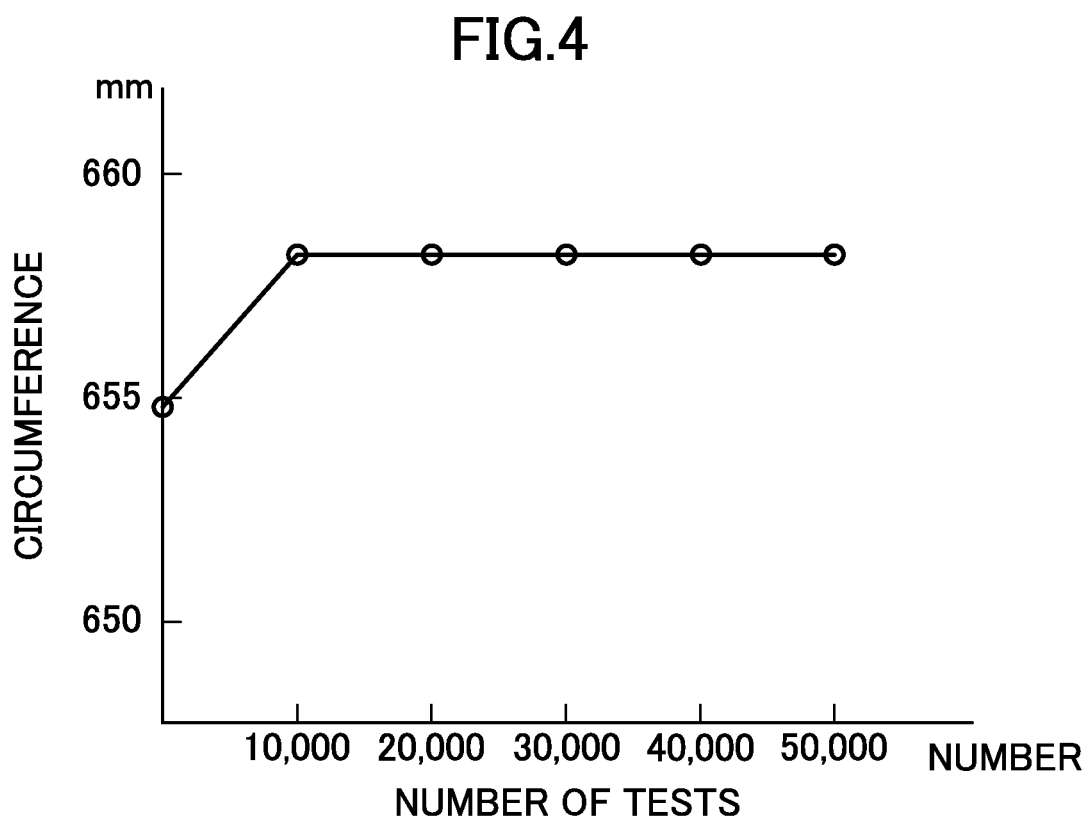
FIG. 4 is a graph showing measurements of enlargement of a ball.

From the evaluation according to a durability testing machine, the duration of life equal to that of conventional balls was confirmed. Enlargement of the ball after 10,000 times, was suppressed, and the service durability was insured (see FIG. 4). The durability testing machine comprises two rotating rollers, and the ball pinched between the rotating rollers is projected at a speed of 50 km/hour to repeatedly hit the ball on an iron plate 1.5 m apart. Upon projecting the ball, it is compressed by about ⅓ of a diameter of the ball. This movement is repeated for giving fatigue to the ball and the enlargement (a length of circumference) is measured.

As can be seen from the foregoing, there is provided the volleyball having soft-touch feeling, not causing pain on contact and having better bounce as compared with conventional balls. The soccer ball and the basketball also have the same advantages as in the volleyball.

EXPLANATION ABOUT REFERENCE NUMERALS

1 nylon filament winding thread of Z twist
1-*a* nylon filament yarn of S twist
1-*b* nylon filament yarn of S twist
2 bladder
3 thread wound reinforced layer
4 rubber cement
5 skin materials

The invention claimed is:

1. A sportsball comprising a spherical hollow rubber bladder filled with compressed air and a thread wound reinforced layer formed by evenly winding nylon filament threads around the surface of the rubber bladder, wherein the nylon filament threads each formed by two filament yarns each of 30~50 deniers with a single twist, are used as winding threads, and each of the twisted nylon filament winding threads has 1800~2000 T/m twist.

2. A method for manufacturing a sportsball, comprising a spherical hollow rubber bladder filled with compressed air and a thread wound reinforced layer formed by evenly winding nylon filament threads around the surface of the rubber bladder, wherein the nylon filament threads each formed by twisting two filament yarns each of 30~50 deniers with a single twist, are used as winding threads, and each of the twisted nylon filament winding threads has 1800~2000 T/m twist, wherein in forming the thread wound reinforced layer, rubber cement is applied as binder to the winding threads simultaneously with winding the threads around the rubber bladder, in addition, the rubber-cement is sprayed onto the winding threads a little after beginning winding the threads around the bladder, and after finishing of winding the threads and then after the threads are cut, the spraying of rubber cement is further effected to cover the wound threads with the rubber cement, after drying, the thread wound bladder is vulcanized and molded under heat to form a carcass, and natural or synthetic leather panels or expanded sheet panels are bonded onto the surface of the carcass with rubber-based bonding adhesive applied onto the surface of the carcass.

\* \* \* \* \*